Aug. 21, 1956 L. C. HOBBS 2,760,062
SIGNAL RESPONSIVE CIRCUIT
Filed June 28, 1952
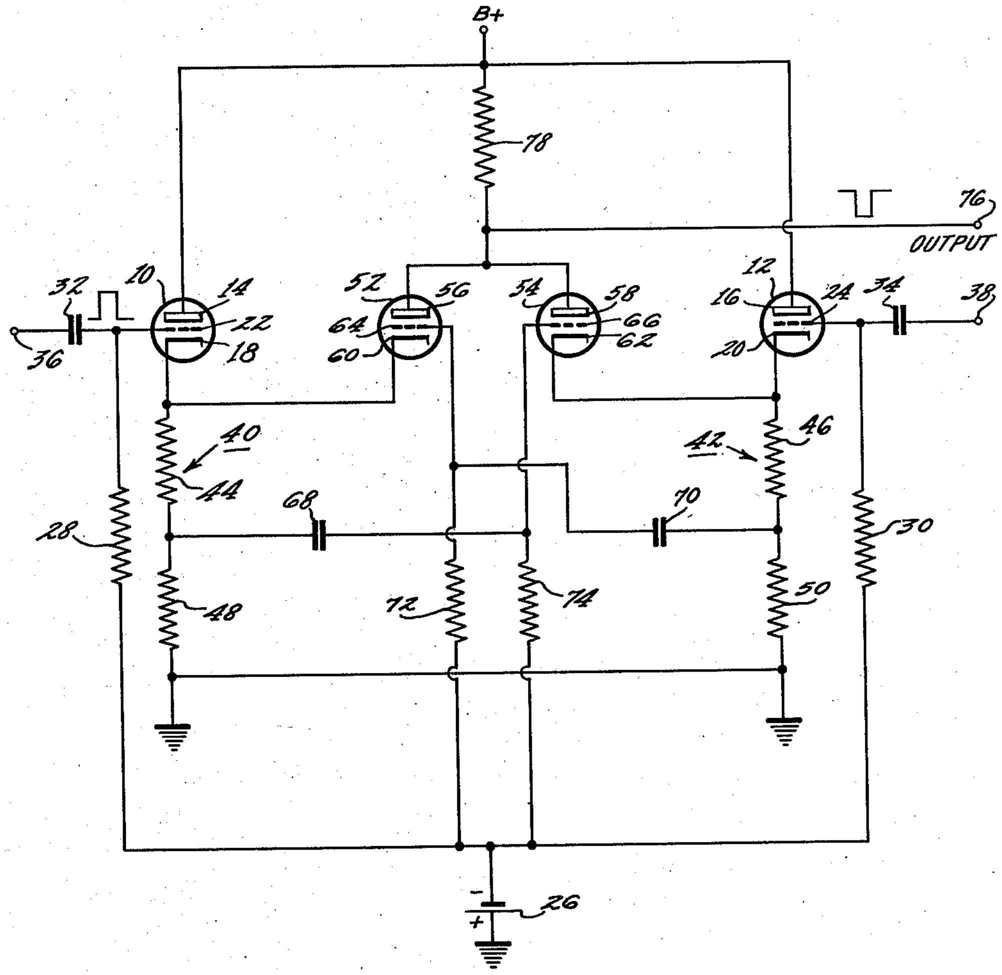
INVENTOR.
Linder C. Hobbs
BY Morris A. Rabkin
ATTORNEY United States Patent Office 2,760,062
Patented Aug. 21, 1956

2,760,062

SIGNAL RESPONSIVE CIRCUIT

Linder C. Hobbs, Haddonfield, N. J., assignor to Radio Corporation of America, a corporation of Delaware Application June 28, 1952, Serial No. 296,159

7 Claims. (Cl. 250—27)

This invention relates to information handling devices and computers; and particularly to an electronic signal responsive circuit having utility therein.

Gating and buffer circuits used in the digital computer art have been given a nomenclature which relates to the logical function performed by the circuit. A gate is sometimes called a logical "and" circuit, and a buffer is called a logical "or" circuit. Circuits of this general type are described in "High-Speed Computing Devices" by Engineering Research Associates, McGraw-Hill, 1950, chapter 4. One form of circuit is that in which the function "either but not both" is produced; that is to say, an output pulse is produced if a signal pulse is applied to either one or the other of two inputs but not if a pulse is applied to both inputs. This type of circuit is of general utility in the digital computer art as a switching circuit. It may also be used to determine if two bits or binary digits of binary coded information are represented by an odd or even number of pulses; and a plurality of such circuits may be combined to perform a parity check.

In the prior art, the operation of "either but not both" generally requires a plurality of circuits which are responsive to different signal combinations, and which are combined to produce the desired result. Such circuits are described in "High-Speed Computing Devices," supra, chapter 13. In a typical example, the desired function is produced indirectly by a plurality of circuits. One of the circuits produces an output pulse when either or both of two inputs receive pulses (an "or" circuit), and another circuit produces an output only when both inputs receive pulses simultaneoulsy (an "and" circuit). The circuits are coupled to neutralize any simultaneous output therefrom when both inputs are pulsed simultaneously, but to produce an output pulse when one or the other input is pulsed. It is apparent that it is desirable to provide an improved and simple circuit which has the inherent function of "either but not both" and which functions in such manner directly and economically.

Accordingly, it is an object of this invention to provide a new and improved signal responsive circuit of the type producing an output signal when a signal is present at either of two inputs but not present at both simultaneously.

Another object of this invention is to provide a simple signal responsive circuit which is economical and reliable.

Still another object of this invention is to provide a simple electronic circuit having two inputs, that translates signals received by either input and that neutralizes signals received simultaneously by both inputs.

These and other objects of this invention are achieved by providing a first and a second output electron discharge tube, each having an anode, a cathode and a control grid. A first input device is coupled to the control grid of the second output tube and to the cathode of the first output tube; and a second input device is coupled to the control grid of the first tube and to the cathode of the second tube. A common output terminal is coupled to the anodes of both output tubes. Both output tubes may be operated normally cut off. A signal applied to either input device results in a positive pulse on the coupled grid of one of the two output tubes. The tube conducts, and an output pulse is produced. However, signals applied to both input devices result in the grids and cathodes of both tubes receiving positive pulses. The pulse on each cathode is sufficiently large to neutralize or inhibit the effect of the pulse on the grid of the same tube. Thus, neither tube conducts, and there is no output pulse.

The organization and method of operation of the invention may be best understood from the following description and the accompanying drawing in which there is shown a schematic circuit diagram of an embodiment of the invention.

Referring to the drawing, a circuit embodying this invention is made up of a first input tube 10 and a second input tube 12, each having an anode 14, 16, a cathode 18, 20, and a control grid 22, 24. The control grid 22, 24 of each input tube 10, 12 is connected to a negative biasing source 26 through a biasing resistor 28, 30. The control grids 22, 24 of the first and second input tubes 10, 12 are also coupled through coupling capacitors 32, 34 to first and second input terminals 36, 38, respectively. The anodes 14, 16 of the tubes are connected to a source of operating potential. The cathodes 18, 20 are connected to ground through cathode impedances 40, 42, each of which is made up of a first resistor 44, 46 and a second resistor 48, 50 connected in series to form a voltage divider. First and second output tubes 52, 54 are provided, each having an anode 56, 58, a cathode 60, 62 and a control grid 64, 66. The cathode 18 of the first input tube 10 is coupled to the cathode 60 of the first output tube 62 and is also cross-coupled to the control grid 66 of the second output tube 54 through the first cathode resistor 44 and a coupling capacitor 68. The cathode 20 of the second input tube is coupled in the same manner to the cathode 62 of the second output tube 54 and cross-coupled through the first cathode resistor 46 and a coupling capacitor 70 to the control grid 64 of the first output tube 52. The control grids 64, 66 of the output tubes 52, 54 are conected to a negative biasing source 26 through biasing resistors 72, 74. The anodes 56, 58 of the output tubes 52, 54 are connected to a common output terminal 76, and through a common load resistor 78 to a source of operating potential. The input terminals 36, 38 may be connected to any suitable source of voltage pulses such as a pulse gating circuit.

The circuit operates as follows: Both the input and output tubes are normally operated at cut-off in the absence of input pulses, and the input tubes function as cathode followers. If a positive pulse is applied to the control grid 22 of the first input tube 10, the tube conducts and current is drawn through the cathode resistors 44, 48. As a result, the cathode 18 of the first input tube 10 rises as does the cathode 60 of the first output tube 52 coupled thereto. Thereby, the first output tube 52 is maintained cut-off. Accompanying the voltage rise at the cathode of the first input tube is a rise in voltage across the second cathode resistor 48. Thereby, a positive pulse is applied to the control grid 66 of the second output tube 54, and that tube conducts. The resulting voltage drop across the anode load resistor 78 produces a negative pulse at the output terminal 76. A negative output pulse is produced in the same way when a positive pulse is applied to the control grid 24 of the second input tube 12. If positive input pulses are applied to both input tubes 10, 12, the control grids 64, 66 of both output tubes 52, 54 are pulsed positively. However, the cathodes 60, 62 of these tubes also rise sufficiently to neutralize or inhibit the effect of the pulses on the control grids, and maintain the tubes cut off. Thus, there is no output pulse if there are two simultaneous input pulses. It is evident that there is no output pulse in the absence of an input pulse. The voltage dividers 40, 42 are utilized to provide a larger pulse on the cathodes 60, 62 of the output tubes 52, 54 than on the control grids 64, 66. Because the voltage drop across the entire voltage divider 40, 42 is greater than that across the second resistor 48, 50, the cathodes will rise faster and further than the control grids. The output tubes are thereby maintained cut off despite variations in tubes and pulses when two input pulses are received simultaneously. Each input tube may be considered as paired with an output tube, and as having the function of a control device to control the voltage on the cathode of the output tube in the same pair and the voltage on the grid of the output tube in the other pair.

A circuit embodying this invention may be used in an error detecting system for digital computers. As described in the patent to Hamming et al., 2,552,629, granted May 15, 1951, in one such system, each binary character or code group is made up of a specific number of elements or bits (each of which is one or the other of the binary digits, 0 and 1) and added thereto are one or more checking elements. The added checking element may be a 0 or 1 to make the total number of 1's in each character even or odd according to a predetermined convention. Each character may then be checked periodically during the various computer operations, and if the number of 1's is not even or odd according to convention, an error is known to exist. This system of coding is known as a "parity code."

A "parity code checker" may be used to ascertain whether the number of 1's (as represented say by positive pulses) present in a binary character is odd or even. A circuit having the function "either but not both" such as described above, produces an output pulse if two parallel binary digits of a binary character have an odd number of 1's, i. e. a 1 and a 0; but there is no output pulse if there is an even number of 1's, i. e. two 1's or zero 1's. A character having any number of binary digits or bits may be checked for parity by a suitable coupling of a plurality of such circuits. For example, to check a four-bit character, two circuits are connected in parallel with each of the four inputs corresponding to one of the bits. The two outputs of these circuits are coupled to the inputs of another circuit constituting the succeeding stage of the parity checker. A pulse or the absence of a pulse from the output of this stage of the parity checker represent respectively an odd or even number of 1's in the four-bit character. In the circuit described, the output is a negative pulse where the input is a positive pulse. Therefore, it would be necessary to invert the output pulse before applying it to the input of the next stage of the parity checker. This may be done in a conventional manner by using a phase inverter stage.

Although it is not intended to limit the invention to any specific circuit parameters, the following components have been found suitable for an arrangement in accordance with the embodiment shown:

| | |
|---|---|
| Tubes 10, 12, 52, 54 | ½ of 5963. |
| Resistors 44, 46 | 1000 ohms. |
| Resistors 48, 50 | 2200 ohms. |
| Resistors 28, 30, 72, 74 | 47,000 ohms. |
| Resistor 78 | 15,000 ohms. |
| Condensers 32, 34, 68, 70 | 1800 micromicrofarads. |
| Source B+ | 120 volts. |
| Source 26 | 10 volts. |

From the foregoing description, it may be seen that the simple circuit embodying this invention inherently produces the function of "either but not both." The circuit is economical in construction and has considerable utility.

What is claimed is:

1. A signal responsive circuit comprising a first and a second input electron discharge tube, a first and second output electron discharge tube, each of said tubes having an anode, a cathode, and a control grid, means coupling one electrode of said first input tube to the cathode of said first output tube and to the control grid of said second output tube, means coupling one electrode of said second input tube to the cathode of said second output tube and to the control grid of said first output tube, means for applying a tube cut-off bias voltage to the control grids of all of said tubes, input terminals coupled to the control grids of said input tubes, means for applying an operating potential to the anodes of said input and output tubes, and a common output terminal coupled to the anodes of said output tubes.

2. A signal responsive circuit as recited in claim 1 wherein said one electrodes of said input tubes are the cathodes of said input tubes.

3. A signal responsive circuit as recited in claim 1 wherein said coupling means include voltage dividers.

4. A signal responsive circuit comprising a first and a second pair of electron discharge tubes each having an anode, a cathode and a control grid, each of said pairs of tubes including an input tube and an output tube, means coupling the cathode of each of said input tubes to the cathode of the output tube of the same pair, means cross-coupling the cathode of each of said input tubes to the control grid of the output tube of the other pair, a different common cathode impedance coupled to the cathodes of each of said pairs of tubes, a first and a second input terminal coupled respectively to the control grids of the input tubes of said first and second pairs of tubes, means for applying tube cut-off bias voltages to the control grids of all of said tubes in the absence of signals at said terminals including a different grid resistor connected to the control grid of each of said tubes, means for coupling the anodes of said input tubes to a source of operating potential, means including a common anode load impedance for coupling the anodes of said output tubes to a source of operating potential, and a common output terminal coupled to the anodes of said output tubes.

5. A signal responsive circuit as recited in claim 4 wherein said cross-coupling means include portions of said common cathode impedances.

6. A signal responsive circuit comprising a first and a second input tube, a first and a second output tube, each of said tubes having an anode, a cathode, and a control grid, means respectively coupling the cathodes of said first and second input tubes to the cathodes of said first and second output tubes, a first and a second voltage divider respectively connected to the cathodes of said first and second input tubes, separate means respectively cross-coupling intermediate points on said first and second voltage dividers to the control grids of said second and first output tubes each including a different capacitor, a first and a second input terminal respectively coupled to the control grids of said first and second input tubes, separate means for applying a tube cut-off bias voltage to the control grid of each of said tubes each including a different grid resistor, and a common anode load resistor and a common output terminal coupled to the anodes of said output tubes.

7. A signal responsive circuit comprising a first and a second input tube, a first and a second output tube, each of said tubes having an anode, a cathode, and a control electrode, a first and a second voltage divider respectively connected as cathode impedances to said first and second input tube cathodes, separate means respectively coupling relatively high voltage terminals on said first and second voltage dividers to said first and second output tube cathodes, separate means respectively coupling relatively low voltage terminals on said first and second voltage dividers to said second and first output tube control electrodes, a first and a second input means respectively coupled to said first and second input tube control electrodes for applying input signals thereto, means for biasing all of said tubes to cut off in the absence of said input signals, and a common anode load resistor and a common output terminal coupled to said output tube anodes.

References Cited in the file of this patent

UNITED STATES PATENTS

| | | |
|---|---|---|
| 2,496,317 | Smith | Feb. 7, 1950 |
| 2,506,439 | Bergfors | May 2, 1950 |
| 2,514,369 | Buehler | July 11, 1950 |
| 2,571,680 | Carbrey | Oct. 16, 1951 |
| 2,567,214 | Kohler | Sept. 11, 1951 |
| 2,596,199 | Bennett | May 13, 1952 |